April 18, 1961     M. HOFFMAN     2,980,434
WORK HOLDING AND CENTERING CHUCK
Filed March 20, 1959

INVENTOR
Max Hoffman

April 18, 1961    M. HOFFMAN    2,980,434
WORK HOLDING AND CENTERING CHUCK
Filed March 20, 1959    3 Sheets-Sheet 2
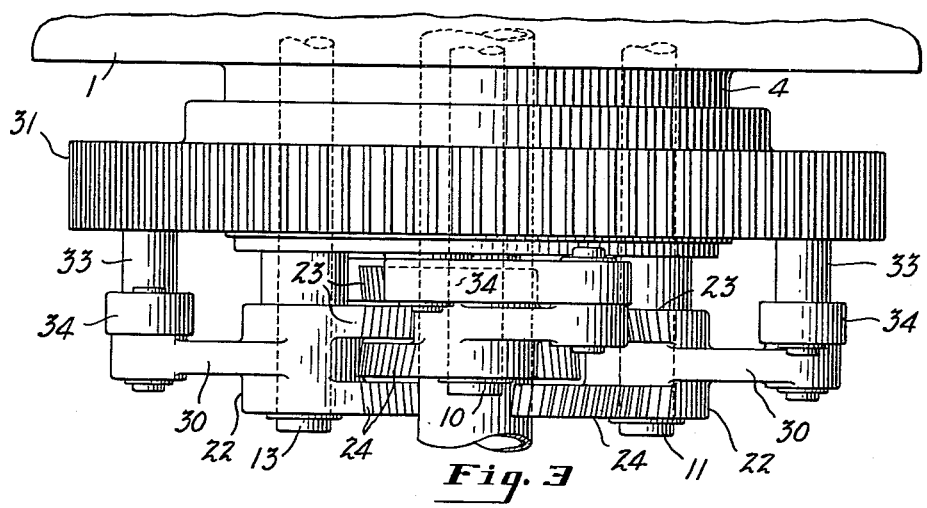
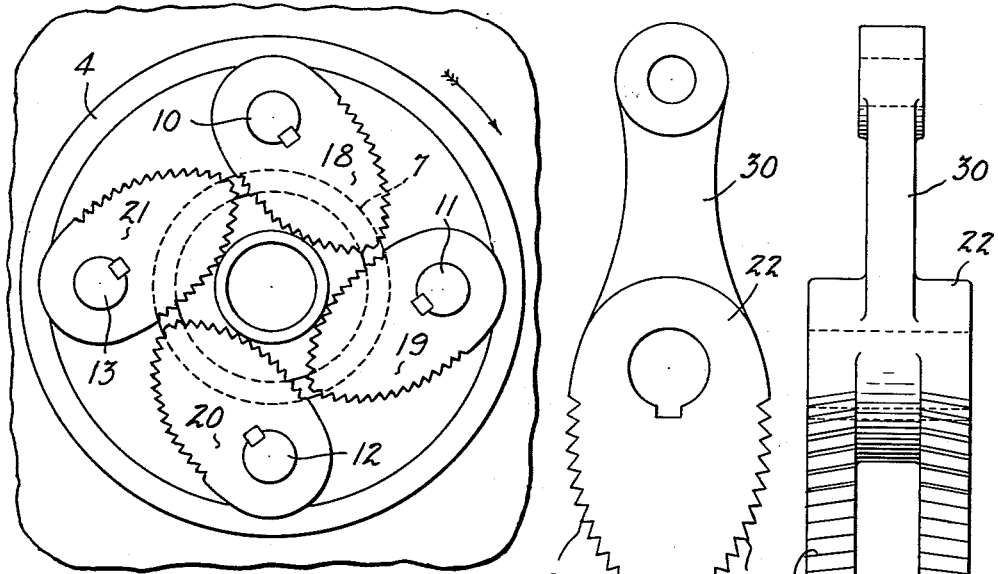
INVENTOR
*Max Hoffman*
BY McCoy, Greene + Te Grotenhuis
ATTORNEYS April 18, 1961 M. HOFFMAN 2,980,434
WORK HOLDING AND CENTERING CHUCK
Filed March 20, 1959 3 Sheets-Sheet 3

INVENTOR
Max Hoffman
BY McCoo, Greene & te Grotenhuis
ATTORNEYS

United States Patent Office 2,980,434
Patented Apr. 18, 1961

2,980,434
WORK HOLDING AND CENTERING CHUCK

Max Hoffman, Rocky River, Ohio, assignor to The Oster Manufacturing Company, Wickliffe, Ohio, a corporation of Ohio Filed Mar. 20, 1959, Ser. No. 800,677

12 Claims. (Cl. 279—106)

This invention relates to work holding and centering chucks and particularly to chucks for holding and centering a workpiece such as a pipe or rod while machining operations are being performed thereon which subject the workpiece to torsional thrusts tending to rotate the same in the chuck.

Machining operations such as turning, reaming or threading may be performed on a stationary workpiece by cutting elements that revolve around the workpiece as shown in the patent to Packer 2,534,878, granted December 9, 1950, or the workpiece itself may revolve with respect to the cutting elements as shown in patent to Chasar 2,614,435, granted October 21, 1952. In either case it is common practice to clamp the workpiece in a chuck having pivoted jaws which grip the workpiece and in which the workpiece when subjected to a torsional thrust in one direction exerts a thrust on the clamping jaws that tends to increase their grip on the workpiece.

The present invention provides a chuck which may be either a rotating chuck or a non-rotating chuck and which has pivoted jaws that may be quickly and easily adjusted to provide a self tightening grip on the workpiece to hold it against turning movements with respect to the chuck in either a clockwise of a counterclockwise direction.

The chuck of the present invention employs a series of equiangularly spaced pivoted clamping jaws that are carried by a spindle which is provided with a central work receiving opening, the clamping jaws being pivoted to the spindle to swing about equiangularly spaced axes that are disposed radially outwardly of the workpiece receiving opening and that are preferably located at equal distances from the spindle axis. The clamping jaws are of a shape and radial length such that they may move into and out of a position in which all of the jaws are disposed radially with respect to the spindle axis, in which position all of the jaw tips are closely adjacent the spindle axis. The jaws are also so shaped and positioned that they can swing simultaneously without interference from an outermost position in which they extend in a clockwise direction from their pivotal axes and are clear of the work receiving opening, to a position in which they extend counterclockwise from their pivotal axes and are clear of the work opening. The jaws have opposite side edges that are curved and tapered toward the tips of the jaws, one side edge of each jaw being engageable with the work when the jaw is swung in a clockwise direction into engagement with the work and the opposite edge of each jaw being engageable with the work when the jaw moves counterclockwise into work engaging position. When the jaws are in a gripping position to which they have moved in a clockwise direction about their axes, a counterclockwise torsional thrust on the workpiece exerts thrusts on the clamping jaws tending to swing them inwardly and tighten the grip on the work. When the opposite edges of the jaws are engaged with the work, clockwise torsional thrusts on the work are resisted. Since the jaws are movable from the position in which they extend clockwise from their axes and are disposed outwardly of the work receiving openings, to a position in which they extend counterclockwise from their pivotal axes and are clear of said opening, they can be quickly and easily adjusted to have self tightening engagement either with a workpiece that is subjected to clockwise torsional thrusts or a workpiece that is subjected to counterclockwise torsional thrusts and, since the jaws are disposed outwardly of the work receiving openings in either of their extreme positions, they are adapted to grip workpieces of very small diameter and workpieces of various diameters less than the diameter of the work receiving opening.

In order to increase the angular thrust on the clamping jaws, the work engaging edges thereof are provided with means for increasing the resistance to slippage of the work. As herein shown the jaw edges are serrated to bite into the workpiece. In order to permit simultaneous movement of the jaws across the work receiving opening without interference, work engaging portions of adjacent jaws which would otherwise engage and prevent such movement are offset so that portions of the jaws can overlap during portions of the movement of the jaws across the work receiving opening.

Reference should be had to the accompanying drawings forming a part of this specification, in which:

Fig. 3 is a fragmentary top plan view of the forward end of the chuck;

Fig. 4 is a fragmentary rear elevation on an enlarged scale viewed as indicated at 4—4 in Fig. 2 and showing the rear jaws in clamping engagement with the workpiece and positioned to resist counterclockwise rotation of the workpiece with respect to the chuck;

Fig. 5 is a front elevation on an enlarged scale of one of the clamping jaws;

Fig. 6 is a side elevation of the jaw;

Fig. 7 shows all of the jaws positioned radially with respect to the spindle axis;

Fig. 8 shows all of the jaws in a position clear of the work receiving opening and extending counterclockwise from their pivotal axes;

Fig. 9 shows all of the jaws extending clockwise from their pivotal axes and clear of the work receiving opening;

Fig. 10 shows the jaws swung clockwise from the position shown in Fig. 9 into engagement with their workpiece;

Figure 1:
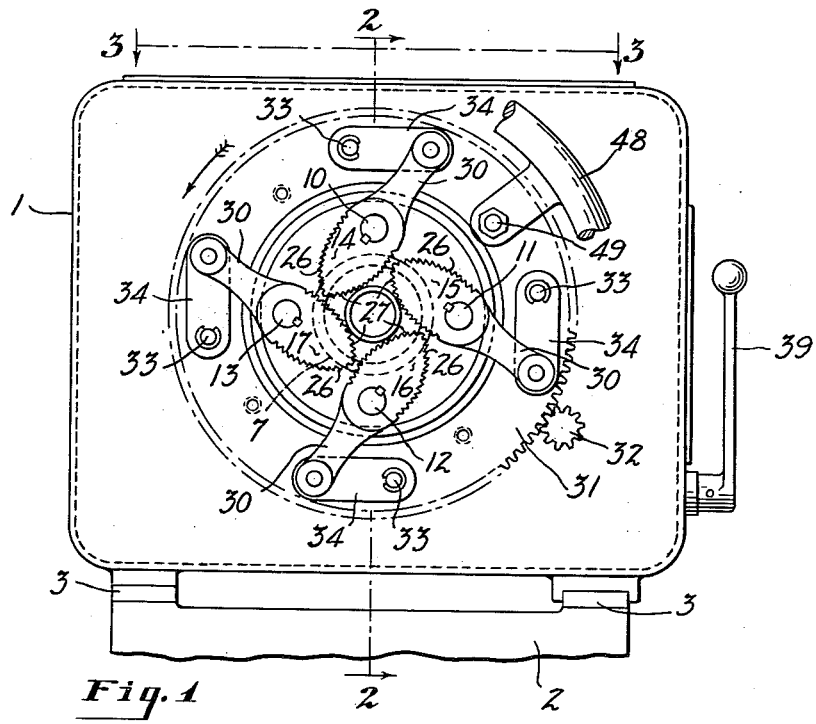
Figure 1 is a front elevation of a chuck embodying the invention showing the jaws in gripping position, the jaws being positioned to resist clockwise rotation of the workpiece with respect to the chuck.

In the accompanying drawings a chuck embodying the invention is shown mounted in a housing 1 that may be carried by a suitable supporting bed or table 2 provided with ways 3 along which the housing may be adjusted. A tubular bearing member 4 extends through the housing and is fixed to front and rear walls 5 and 6 of the housing 1. A tubular spindle 7 is mounted coaxially within the tubular bearing member 4, the spindle 7 being supported in front and rear disks 8 and 9 that are mounted in the front and rear ends of the bearing member 4. As herein shown the spindle 7 is fixed to and turns with the disks 8 and 9 which are rotatably mounted within the bearing member 4. Four parallel axially extending shafts 10, 11, 12 and 13 are journaled in the disks 8 and 9 and have opposite ends projecting past the ends of the tubular spindle 7. The shafts 10, 11, 12 and 13 are equally spaced with respect to one another and with respect to the axis of the spindle 7.

Identical clamping jaws 14, 15, 16 and 17 are keyed to the front ends of the shafts 10, 11, 12 and 13 beyond the forward end of the spindle 7 and extend radially from the axes of their supporting shafts a distance slightly less than the distance from the axes of said shafts to the spindle axis. Jaws 18, 19, 20 and 21 with work engaging portions of the same size and shape as the jaws 14, 15, 16 and 17 are keyed to the rear ends of the shafts 10, 11, 12 and 13 beyond the rear end of the spindle 7, the jaws carried by the opposite ends of each shaft being in axial alinement so that they simultaneously engage with a pipe or other workpiece of uniform diameter.

As best shown in Figs. 5 and 6, each of the identical work clamping jaws is provided with a hub portion 22 and with axially spaced inner and outer work engaging portions 23 and 24 that are integral with the hub 22. The work engaging portions 23 and 24 provide a recess between them that is of a width greater than the thickness of the work engaging portions, so that a work engaging portion of an adjacent jaw may be received in a space 25. Each work engaging portion is provided with opposite edges 26 and 27 that are curved and that taper toward a narrow jaw tip 28.

Figure 2:
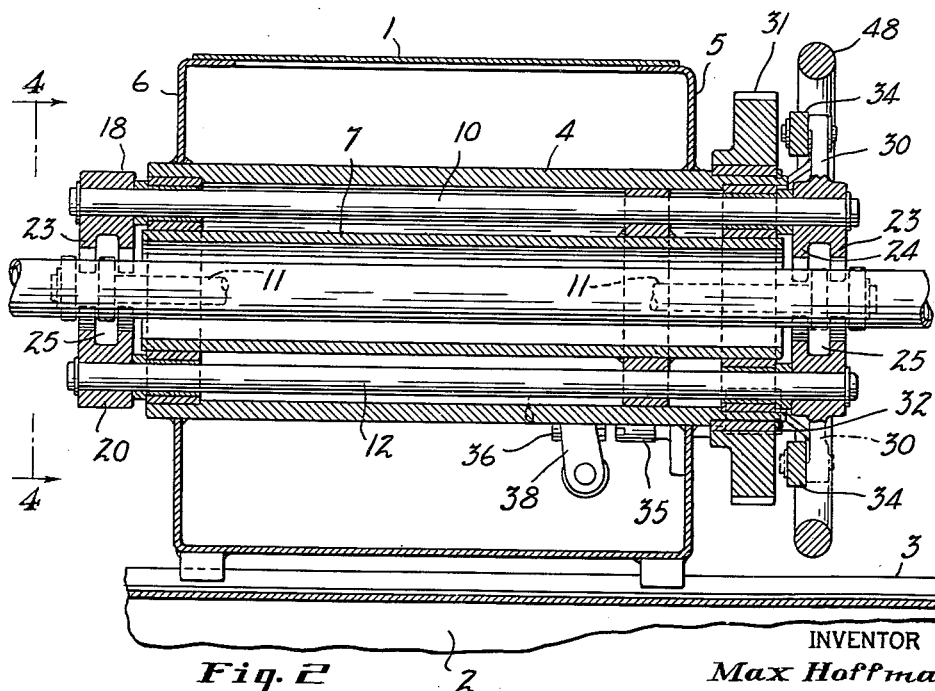
Fig. 2 is a vertical section taken on the line indicated at 2—2 in Fig. 1.
Figure 7:
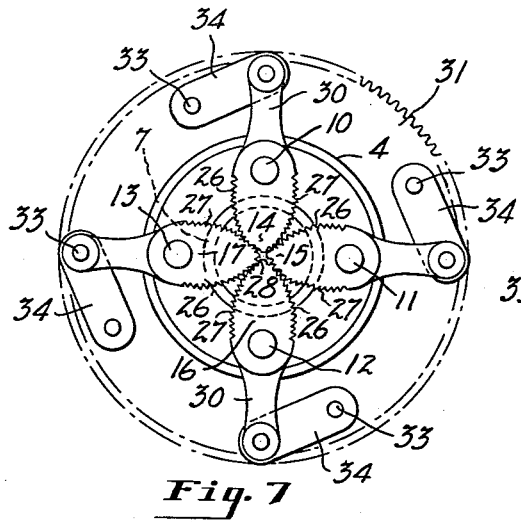
Figs. 7 to 10 are elevations showing the jaws in various angular positions to which they may be moved.

As shown in Figs. 2 and 3, the jaws carried by one pair of diametrically opposite shafts 10 and 12 are in transverse alinement and the pair of jaws carried by the other pair of diametrically opposite shafts 11 and 13 are also in transverse alinement but offset axially with respect to the jaws carried by the shafts 10 and 12 a distance sufficient to aline one of the work engaging portions of the jaws of each pair with the spaces 25 between the work engaging portions 23 and 24 of the jaws of the other pair. As shown in Fig. 7, each work engaging jaw is of a length to extend from its pivot to a point closely adjacent the spindle axis. The spacing of the work engaging portions 23 and 24 of each of the jaws and the axial offsetting of the jaws of the two pairs permits each jaw to interfinger with adjacent jaws and swing freely from the extreme position shown in Fig. 8 to the extreme position shown in Fig. 9, so that the jaws may be readily adjusted to engage the work either with their edges 26 or with their edges 27. In order to provide greater resistance to slippage between the work and the chuck jaws, the edges 26 and 27 of the jaws may be provided with serrations 29 which incline generally toward the tips 28 of the jaws.

As shown in Fig. 6 of the drawings, the work engaging edges 23 and 24 taper axially toward the central space 25 and the serrations 29 are angularly disposed, extending inwardly toward the space 25 at a small angle to axially extending lines and converging toward the pivotal axis of the jaw. The tapering of the work engaging edges and the inclination of the serrations provide the serrations with points adjacent the opposite faces of the jaws that bite into the workpiece to resist turning movements.

Each of the jaws 14, 15, 16 and 17 extends radially with respect to its pivotal axis and each jaw has an integral arm 30 that extends from the pivotal axis of the jaw in a direction opposite that of the jaw and the jaws are turned simultaneously in either direction about their pivotal axes by means of a ring gear 31 that is rotatably mounted on the front end of the bearing member 4. Rotation may be imparted to the ring gear 31 through a pinion 32 in mesh therewith that may be driven by any suitable means. The ring gear 31 has equiangularly spaced pins 33, one for each of the jaws, that are connected to the outer ends of the arms 30 by links 34 of equal length and projecting in the same direction from the pins 33. The turning movement of the ring gear 31 in a clockwise direction with respect to the spindle 7 swings the jaws to the position shown in Fig. 8 and counterclockwise turning movements of the ring gear 31 with respect to the spindle swings the jaws to the position shown in Fig. 9. In the position shown in Fig. 8 the tips 28 of the clamping jaws have been brought into engagement with one face of each of the arms 30 to limit the outward movement of the jaws. In the position shown in Fig. 9 the tips 28 of the jaws have been brought into engagement with the opposite faces of the arms 30 to limit movement of the jaws in reverse direction.

Figure 8:
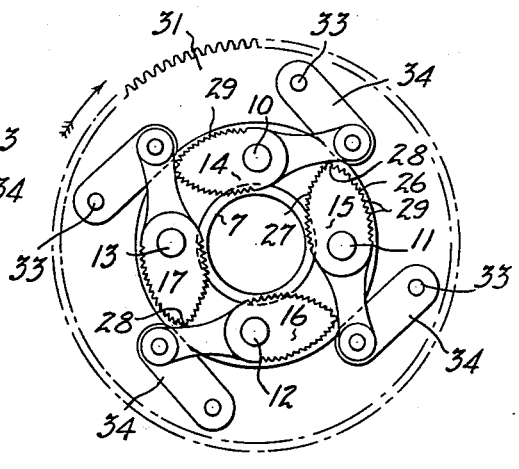
Figure 9:
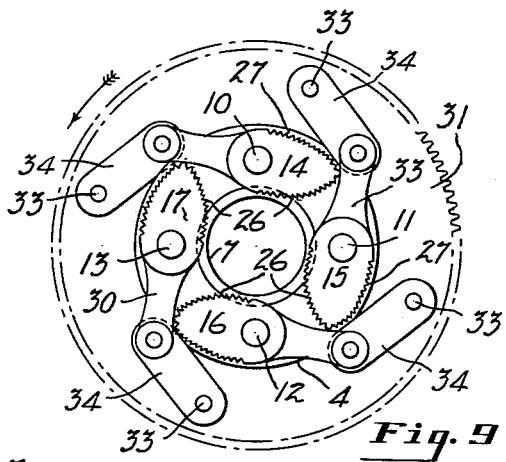
Figure 10:
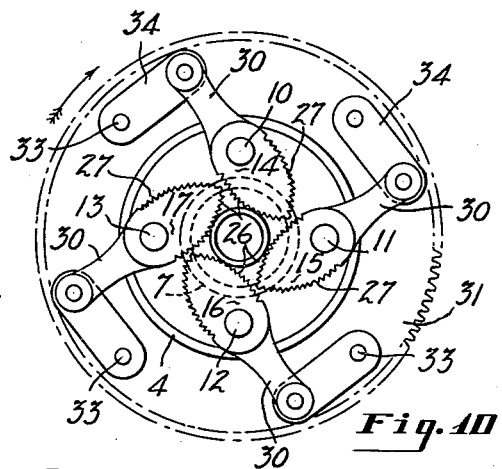

Rotation of the ring gear with respect to the spindle in a clockwise direction moves the jaws from the position shown in Fig. 9 to the work gripping position shown in Fig. 10, in which position the jaws are tightened on the work by resistance to rotation of the workpiece in a clockwise direction when the spindle is rotatable and by a counterclockwise torsional thrust on the workpiece when the spindle is held against rotation. Counterclockwise turning movement of the ring gear with respect to the spindle swings the jaws from the position shown in Fig. 8 to the work gripping position shown in Fig. 1, in which position the jaws tighten on the workpiece to drive the same in a counterclockwise direction or to resist counterclockwise rotation of the workpiece with respect to the chuck.

It will be apparent that if the spindle 7 is rotatable, rotation of the ring gear in one direction or the other will swing the jaws across the work receiving opening and upon engagement with the work, movement of the jaws will be arrested and the spindle will thereafter rotate with the ring gear. It will also be apparent that if the spindle 7 is held against rotation, turning movement of the ring gear will move the jaws into clamping engagement with the work and hold the work against turning movement with respect to the spindle in the same manner as when the spindle and work rotate in unison, due to the self tightening clamping action of the jaws.

In order to enable the chuck to be used either as a rotating work holder or as a stationary work holder and also to facilitate the adjustment of the clamping jaws from one extreme position to the other, means is provided for disconnecting the driving mechanism from the driving gear 32 or connecting the driving mechanism to the gear and for simultaneously locking the spindle against rotation or releasing the spindle.

Figure 11:
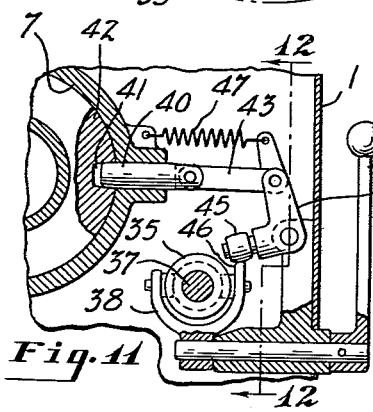
Fig. 11 is a front elevation, partly in section, showing a manually operable means for simultaneously disconnecting the drive mechanism and locking the spindle against rotation.
Figure 12:
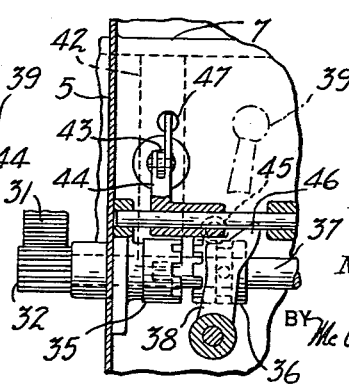
Fig. 12 is a section taken on the line indicated at 12—12 in Fig. 11.

As shown in Figs. 11 and 12, the gear 32 is connected by means of disengageable clutch elements 35 and 36 to a shaft 37 that may be driven by any suitable means such as an electric motor (not shown). The clutch element 35 is connected to the gear 32 to rotate therewith and the clutch element 36 is slidably keyed to the drive shaft 37. The clutch element 36 is shifted into or out of engagement with the clutch element 35 by means of a shifter yoke 38 operated by a hand lever 39.

As herein shown, the spindle 7 is locked against rotation by means of a radially disposed locking pin 40 that is slidably mounted in the bearing member 4 and that engages in any one of a series of angularly spaced openings 41 in a disk 42 fixed to the spindle 7. The pin 40 is connected by a link 43 with a bell crank lever 44 that has a roller 45 engaging a cam 46 carried by the yoke 38. The pin 40 is pressed toward its locking position by a spring 47 and is moved to releasing position by the cam 46 when the clutch element 36 is disengaged from the clutch element 35. Movement of the shifter yoke 38 in a direction to release the clutch releases the roller 45 and permits the spring 47 to press the pin 40 into the first opening 41 that moves into registry with it.

A hand wheel 48 may be attached to the ring gear 31 by means of bolts 49 for turning the ring gear to move the jaws from one extreme position to the reverse position when the spindle is locked. The clutch, spindle lock and hand wheel provide a convenient means for adjusting the gripping jaws without stopping the motor. To reverse the jaws it is only necessary to actuate the lever 39 to release the clutch and then to flip the hand wheel to swing the jaws from one extreme position to the other.

When the chuck is power driven a reversible drive mechanism is required. The release of the workpiece is effected by reversing the direction of drive and adjustment from one extreme angular position to the other may be effected by again reversing the motor after the workpiece is removed.

It will be apparent from inspection of Figs. 8 and 9 that the clamping jaws must move through an angle greater than 45° in either direction from the radial position shown in Fig. 7 in order to move the jaws clear of the spindle opening.

It is to be understood that for some purposes a single set of clamping jaws such as shown at the forward end of the spindle 7 may be sufficient. However, for the handling of elongated workpieces, axially spaced simultaneously operating sets of clamping jaws such as herein shown are desirable. The jaws 18, 19, 20 and 21 are ordinarily identical in shape to the jaws 14, 15, 16 and 17 and axially alined therewith, the jaws 18, 19, 20 and 21 differing from the jaws 14, 15, 16 and 17 only in that the actuating arms 30 are omitted.

It is to be understood that in accordance with the provisions of the patent statutes, variations and modifications of the specific devices herein shown and described may be made without departing from the spirit of the invention.

What I claim is:

1. A work holding and centering chuck comprising a spindle that has a central work receiving opening, a series of work clamping jaws pivoted to said spindle to swing about axes disposed radially outwardly with respect to said opening and substantially equally spaced with respect to one another and the spindle axis, each jaw having work gripping side edges that taper toward a tip that is at a distance from its pivotal axis slightly less than the distance between said pivotal axis and the spindle axis and that has portions of its work gripping edges axially offset with respect to the gripping edges of the next adjacent jaws to permit simultaneous movement of all the jaws in either direction about their axes past a central position in which the tips of all the jaws are closely adjacent the spindle axis, and means for simultaneously moving said jaws angularly about their axes and across said work receiving opening from either side of said central position to grip a work piece positioned in said opening and in the path of said jaws.

2. A work holding and centering chuck according to claim 1 in which each jaw has an arm movable therewith that projects oppositely from its pivotal axis, said arms being simultaneously engageable with jaws movable about other pivots to limit the movement of the jaws about their axes in either direction.

3. A work holding and centering chuck according to claim 1 which has four work gripping jaws in which the gripping edges of the jaws movable about one pair of diametrically opposite pivotal axes are axially offset with respect to the gripping edges of the jaws that are movable about the other pair of pivotal axes.

4. A work holding and centering chuck comprising a rotatably mounted spindle that has a central work receiving opening, a series of work clamping jaws pivoted to said spindle to swing about axes disposed radially outwardly with respect to said opening and substantially equally spaced with respect to one another and the spindle axis, each jaw having a plurality of work engaging portions of substantially the same size and shape, that are disposed substantially perpendicular to the pivotal axis of the jaw and that are spaced apart axially a distance greater than their axial thickness, each jaw having its work engaging portions offset axially with respect to the work engaging portions of adjacent jaws and positioned to enter the spaces between the work engaging portions of adjacent jaws, and means for simultaneously imparting to all of the jaws the same angular movements with respect to their pivotal axes in either direction across said work receiving opening to grip a work piece positioned in said opening and in the path of said jaws.

5. A work holding and centering chuck according to claim 4 in which the edges of said work engaging portions taper inwardly from their external side faces.

6. A work holding and centering chuck according to claim 5 in which the serrations of the spaced work engaging portions of each jaw extend across the edges thereof at opposite inclinations with respect to lines parallel to the pivotal axis of the jaws and converge toward said axis.

7. A work holding and centering chuck comprising a rotatably mounted spindle that has a central work receiving opening, a series of work clamping jaws pivoted to said spindle to swing about axes disposed radially outwardly with respect to said opening and substantially equally spaced with respect to one another and the spindle axis, each jaw having serrated work gripping side edges that taper toward a tip that is at a distance from the pivotal axis of the jaw slightly less than the distance between said pivotal axis and the spindle axis and that has portions of its work gripping edges axially offset with respect to the gripping edges of the next adjacent jaws to permit simultaneous movement of all the jaws in either direction about their axes past a position in which the tips of all the jaws are closely adjacent the spindle axis, and means for moving said jaws angularly about their pivotal axes simultaneously in either direction and across said work receiving opening and for applying a thrust through said jaws to said spindle that increases with an increase in the resistance of the jaws to pivotal movement to rotate the spindle in one direction or the other upon engagement of the jaws with a workpiece.

8. A work holding and centering chuck comprising a rotatably mounted spindle that has a central work receiving opening, a series of work clamping jaws pivoted to said spindle to swing about axes disposed radially outwardly with respect to said opening and substantially equally spaced with respect to one another and the spindle axis, each jaw having serrated work gripping side edges that taper toward a tip that is at a distance from the pivotal axis of the jaw slightly less than the distance between said pivotal axis and the spindle axis and that has portions of its work gripping edges axially offset with respect to the gripping edges of the next adjacent jaws to permit simultaneous movement of all the jaws in either direction about their axes past a position in which the tips of all the jaws are closely adjacent the spindle axis, a ring coaxial with said spindle and mounted to turn independently of said spindle, and means connecting said ring to said jaws for moving said jaws angularly about their pivotal axes simultaneously in either direction and across said work receiving opening and for applying a thrust through said jaws to said spindle that increases with an increase in the resistance of the jaws to pivotal movement to rotate the spindle in one direction or the other upon engagement of the jaws with a workpiece.

9. A work holding and centering chuck comprising a tubular open ended spindle providing a work receiving opening, four work clamping jaws pivoted to said spindle to swing across an open end of said spindle about equiangularly spaced axes disposed radially outwardly of said opening, means for swinging the jaws simultaneously at equal rates in one direction or the other across said opening, each jaw having a plurality of axially alined work engaging portions of the same size and shape, each provided at opposite sides thereof with serrated work engaging edges that taper toward the jaw tip, said work engaging portions being spaced apart axially a distance greater than their thickness, the work engaging edges of the two jaws of each pair that swing about diametrically opposite pivotal axes being in alinement and the jaws of each of said pairs being of a length such that there is a small clearance between their tips when both are radially disposed with respect to the spindle axis, the work engaging portions of the jaws of one of said pairs being axially offset with respect to the work engaging portions of the jaws of the other of said pairs to permit entry of work engaging portions thereof into spaces between the work engaging portions of the jaws of the other pair during swinging movements of the jaws.

10. A work holding and centering chuck according to claim 9 in which each jaw has an arm movable therewith that projects oppositely from the pivotal axis of the jaw and that is movable into the paths of movement of the circumferentially adjacent jaws to limit the outward swinging movements thereof.

11. A work holding and centering chuck comprising a rotatably mounted spindle that has a central work receiving opening, a series of work clamping jaws pivoted to said spindle to swing about axes disposed radially outwardly with respect to said opening and substantially equally spaced with respect to one another and the spindle axis, each jaw having serrated work gripping side edges that taper toward a tip that is at a distance from the pivotal axis of the jaw slightly less than the distance between said pivotal axis and the spindle axis and that has portions of its work gripping edges axially offset with respect to the gripping edges of the next adjacent jaws to permit simultaneous movement of all the jaws in either direction about their axes past a position in which the tips of all the jaws are closely adjacent the spindle axis, a ring coaxial with said spindle and mounted to turn independently of said spindle, means connecting said ring to said jaws for moving said jaws angularly about their pivotal axes simultaneously in either direction and across said work receiving opening and for applying a thrust through said jaws to said spindle that increases with an increase in the resistance of the jaws to pivotal movement to rotate the spindle in one direction or the other upon engagement of the jaws with a workpiece, driving means for rotating said ring in either direction, and means for simultaneously disconnecting said ring from said driving means and locking said spindle against rotation.

12. A work holding and centering chuck according to claim 11 in which manually operable means is provided for turning said ring when said spindle is locked.

References Cited in the file of this patent
UNITED STATES PATENTS

| | | |
|---|---|---|
| 1,232,508 | Davidson | July 10, 1917 |
| 2,613,564 | Waldraven et al. | Oct. 14, 1952 |
| 2,667,356 | Forward | Jan. 26, 1954 |
| 2,890,888 | Damijonaitis | June 16, 1959 |